United States Patent [19]
Borkan

[11] 4,146,923
[45] Mar. 27, 1979

[54] ENERGY MONITOR AND CONTROL SYSTEM

[76] Inventor: William N. Borkan, 3031 Prairie Ave., Miami Beach, Fla. 33140

[21] Appl. No.: 791,093

[22] Filed: Apr. 26, 1977

[51] Int. Cl.² .......................... H02J 3/14; G05B 15/00
[52] U.S. Cl. .................................... 364/483; 364/492; 307/52
[58] Field of Search ...................... 235/151.21; 307/35, 307/39, 41, 52, 62; 324/103; 364/483, 492, 493

[56] References Cited

U.S. PATENT DOCUMENTS

| | | | |
|---|---|---|---|
| 3,602,703 | 8/1971 | Polenz | 235/151.21 |
| 3,789,201 | 1/1974 | Carpenter et al. | 235/151.21 |
| 3,862,430 | 1/1975 | Lenhart et al. | 307/62 X |
| 3,872,286 | 3/1975 | Putman | 235/151.21 |
| 3,987,308 | 10/1976 | Burch | 307/52 X |

*Primary Examiner*—Edward J. Wise
*Attorney, Agent, or Firm*—Leitner, Palan, Martin & Bernstein

[57] ABSTRACT

A system for controlling a plurality of variable rate consuming units using a unique sequence to optimize the number of units on and the total consumption of the units relative to a target by increasing and decreasing total consumption from a status position in said sequence in response to a comparison of the total consumption of all units with a target and to a comparison of the total consumption with the target minus the differential consumption to the next step from the status position in the unique sequence. The units status and the results of the comparisons address a device storing said unique sequence to provide consumption requested status which may be overridden by a cycling means to provide a minimum and maximum off time and minimum on time demand command status for demand controllable units. A real time clock addresses a storage device to provide command status for time controllable units. The time command status and demand command status may be ORed to provide command status for units which are both demand and time controllable.

51 Claims, 8 Drawing Figures

FIG.1

| LEVELS | $U_n$ | $U_{(n-1)}$ | $U_3$ | $U_2$ | $U_1$ |
|---|---|---|---|---|---|
| 1 | 0 | 0 --------- 0 | | 0 | 0 |
| 2 | 0 | 0 --------- 0 | | 0 | 1 |
| 3 | 0 | 0 --------- 0 | | 1 | 0 |
| 4 | 0 | 0 --------- 1 | | 0 | 0 |
| ⋮ | | | | | |
| n | 0 | 1 --------- 0 | | 0 | 0 |
| n+1 | 1 | 0 --------- 0 | | 0 | 0 |
| n+2 | 1 | 0 --------- 0 | | 0 | 1 |
| n+3 | 1 | 0 --------- 0 | | 1 | 0 |
| n+4 | 1 | 0 --------- 1 | | 0 | 0 |
| ⋮ | | | | | |
| 2n | 1 | 1 --------- 0 | | 0 | 0 |
| 2n+1 | 1 | 1 --------- 0 | | 0 | 1 |
| ⋮ | | | | | |
| $1+\sum_{X=1}^{n} X$ | 1 | 1 --------- 1 | | 1 | 1 |

WHERE n IS THE NUMBER OF CONTROLLABLE UNITS AND THE UNITS ARE IN INCREASING ORDER OF CONSUMPTION WHEREIN $U_1$ IS THE SMALLEST UNIT

FIG.7

| LEVELS | $U_6$ | $U_5$ | $U_4$ | $U_3$ | $U_2$ | $U_1$ |
|---|---|---|---|---|---|---|
| 1 | 0 | 0 | 0 | 0 | 0 | 0 |
| 2 | 0 | 0 | 0 | 0 | 0 | 1 |
| 3 | 0 | 0 | 0 | 0 | 1 | 0 |
| 4 | 0 | 0 | 0 | 1 | 0 | 0 |
| 5 | 0 | 0 | 1 | 0 | 0 | 0 |
| 6 | 0 | 1 | 0 | 0 | 0 | 0 |
| 7 | 1 | 0 | 0 | 0 | 0 | 0 |
| 8 | 1 | 0 | 0 | 0 | 0 | 1 |
| 9 | 1 | 0 | 0 | 0 | 1 | 0 |
| 10 | 1 | 0 | 0 | 1 | 0 | 0 |
| 11 | 1 | 0 | 1 | 0 | 0 | 0 |
| 12 | 1 | 1 | 0 | 0 | 0 | 0 |
| 13 | 1 | 1 | 0 | 0 | 0 | 1 |
| 14 | 1 | 1 | 0 | 0 | 1 | 0 |
| 15 | 1 | 1 | 0 | 1 | 0 | 0 |
| 16 | 1 | 1 | 1 | 0 | 0 | 0 |
| 17 | 1 | 1 | 1 | 0 | 0 | 1 |
| 18 | 1 | 1 | 1 | 0 | 1 | 0 |
| 19 | 1 | 1 | 1 | 1 | 0 | 0 |
| 20 | 1 | 1 | 1 | 1 | 0 | 1 |
| 21 | 1 | 1 | 1 | 1 | 1 | 0 |
| 22 | 1 | 1 | 1 | 1 | 1 | 1 |

FIG.8

| | COMPARATORS | | | | | | | DEMAND STATUS (DCS) | | | | | | REQUEST STATUS (CRS) | | | | | |
|---|---|---|---|---|---|---|---|---|---|---|---|---|---|---|---|---|---|---|---|
| | 52 | 50 | 48 | 46 | 44 | 42 | 40 | 6 | 5 | 4 | 3 | 2 | 1 | 6 | 5 | 4 | 3 | 2 | 1 |
| A | 0 | 0 | 0 | 0 | 0 | 0 | 1 | 0 | 0 | 0 | 0 | 0 | 0 | 0 | 0 | 0 | 0 | 0 | 1 |
| B | 0 | 0 | 0 | 0 | 0 | 0 | 1 | 0 | 0 | 0 | 0 | 0 | 1 | 0 | 0 | 0 | 0 | 1 | 0 |
| C | 0 | 0 | 0 | 0 | 0 | 0 | 0 | 1 | 1 | 0 | 0 | 1 | 0 | 1 | 1 | 0 | 0 | 1 | 0 |
| D | 0 | 0 | 0 | 0 | 0 | 1 | 0 | 1 | 1 | 0 | 0 | 1 | 0 | 1 | 1 | 0 | 0 | 1 | 0 |
| E | 0 | 0 | 0 | 0 | 1 | 1 | 0 | 1 | 1 | 0 | 0 | 1 | 0 | 1 | 1 | 0 | 0 | 0 | 1 |

ENERGY MONITOR AND CONTROL SYSTEM

BACKGROUND OF THE INVENTION

The present invention relates generally to energy management and more particularly to the implementation of a unique sequence to achieve optimization of variable selection.

Recent world-wide primary fuel shortages are forcing the industrial and commercial sectors of industrial nations to reduce and control power consumption. Energy management systems have been developed to permit individuals or plants to control their power demand and consumption, thereby lowering costs and making more effective utilization of power consumed. The general approaches toward regulating power demand are generally known as instantaneous demand, ideal rate, converging rate, predicted demand, and continuous integral. The first four methods concentrate on limiting the load in the demand charged interval measured by the utility companies.

The instantaneous demand controllers compare the rate of energy consumption, or slope of the energy curve relative to time, with a preset rate. When the instantaneous rate exceeds the preset rate, loads are shed to reduce consumption and when the instantaneous rate is less than the preset rate, loads are restored to increase the rate of consumption. This method generally does not take full advantage of the available power and has a tendency to short cycle loads turning them on and off frequently.

Another group of instantaneous demand controllers draws a straight line from zero to the power level required for the demand interval. This requires a synchronization pulse and the loads are instantaneously shed to stay below the line. A second line offset by a small margin from the first line having the same slope is the restoration line. As with the previous instantaneous demand controller, this system also does not take full advantage of the available power and tends to short cycle loads. An additional difficulty with this system is obtaining the demand interval synchronization pulse.

The ideal rate controllers operate as the instantaneous demand controllers except that the line representing the rate of power consumption for the demand interval is offset from time zero along the power axis as are the shed and restoration lines which lie below the ideal rate line. By offsetting these lines from zero, the system will not prematurely act to control the loads too early in the demand period. As with the previous system, a synchronization pulse is required and maximum use of the available power is not achieved.

A modification of the ideal rate controller is the converging rate controller wherein the restoration line, shed line, and ideal rate line converge to a point at the end of the demand period. As with the previous system, it requires a synchronization pulse, and even though it comes closer to reaching the final target, it requires more load cycling than the ideal rate system.

The fourth system, requiring a considerable amount of calculation, is the predicted demand system. A curve of predicted usage for the remainder of the demand interval using the average usage in the interval and the instantaneous usage of the particular moment is estimated. If the curve of the projected usage exceeds the target point at the end of the interval, action is taken so as to modify the power usage and the predicted curve is modified accordingly. This method requires fairly sophisticated electronics and generally includes a computer, thus pricing itself out of the reach of all but major industrial users.

The fifth method of power control is the continuous integral method. In this method, power usage is monitored continuously over a very small time interval and loads are shed or restored to continuously maintain the power below a fixed level. This method is not related to the demand period and consequently does not need the synchronization pulse. By eliminating excessive cycling of loads produced by the other methods, this method achieves a higher overall power factor.

The following U.S. Patents show the state of the art of continuous integral controllers or hybrids thereof wherein the loads are added or shed to maintain the total power consumption below or within preset limits: U.S. Pat. Nos. 3,652,838; 3,714,453; 3,769,520; 3,862,430; 3,872,286; 3,987,308.

These prior art systems, though being of the continuous integral type and thus being an improvement over the prior art generally, unless they are computer controlled, do not provide optimization of the number of loads on and of the power consumption. The inability to achieve this optimization results from the priority scheme used for shedding and/or restoring loads. Thus there exists a need for a priority scheme or sequence for restoring and shedding loads which optimizes the number of loads on and the amount of power being consumed below a target value.

SUMMARY OF THE INVENTION

The present invention is a continuous integral system for optimizing the number of units on and the consumption of the units relative to a target consumption value by using the unique count or sequence of FIG. 1 to increase and decrease total consumption. The total consumption of all units are compared in a window comparator wherein the upper limit of the window is the target consumption level and the lower limit of the window comprises a plurality of lower limit comparators representing the target minus the differential between demand controllable units. The optimization sequence is stored in a memory which is addressed using the status of the demand controllable units in combination with the output of the window comparators such that the sequence is traversed from the status position in the sequence to decrease total consumption when the total consumption exceeds the target value and traverses the sequence to increase total consumption when the total consumption is less then the target minus the differential of consumption for the next step in the sequence from the status position, as defined by the lower value of the window comparator for that step.

An override comparator is also provided to sense a measurable variable, for example, a environment related variable, so as to override the window comparators and either enter the optimization sequence at a special status or to traverse the optimization sequence out of sequence or traverse the sequence for a smaller number of units. The output of the optimization storage device are consumption requested status which can be overridden or modified in a demand override circuit having a cycling device to define the minimum and maximum off time and to define a minimum on time for each demand controllable unit. This provides a demand command status which is used to control the units and as the status portion of the address for the optimization sequence.

A scheduling circuit which produces the time command status consists of a storage device which is addressed by a real time clock. The scheduling circuit produces time command status to time controllable units. Shed demand and time command status may be ORed to provide command status for units which are both demand and time controllable. The total consumption of all units, which is the input to the window comparators, includes demand controllable units, time controllable units, demand and time controllable units, and non-controllable units.

OBJECTS OF THE INVENTION

Objects of the present invention is to provide a continuous integral control system which optimizes the number of units on and the total power consumption.

Another object is to provide an energy management system using a unique optimization count.

A further object of the invention is to provide a unique priority sequence for use with controllable environments or systems.

Still another object is to provide an inexpensive energy management control system providing the optimization equal to or better than expensive computer control systems.

An even further object of the invention is to provide a total energy management system which incorporates consumption limiting requirements and time or scheduling related requirements with provisions for additional control variables.

Other objects, advantages, and novel features of the present invention will become apparent from the following description of the present invention when considered in conjunction with the accompanying drawings.

BRIEF DESCRIPTION OF THE DRAWINGS

FIG. 1 is a table of the count or sequence of the present invention.

FIG. 7 is a six unit implementation of the count of FIG. 1.

FIG. 8 is a table of examples of the relationship of the consumption requested, demand command, time command, and command statuses.

DESCRIPTION OF THE PREFERRED EMBODIMENTS

The optimization count, which provides optimization in a control system using a priority as a decision tool, is illustrated in FIG. 1. The units $U_1$ through $U_n$ are placed in increasing order of consumption, or other measurable variables which are to be controlled. A zero in the table will indicate that the unit is on and a one will indicate that the unit is off. Although the zero/one is defined as unit on/off, it is obvious that $U_1$ and $U_2$ may be subsections or difference value command signals for a single variable control load. Traversing the table from level 1, wherein all the units are on, to level 2, unit $U_1$ is turned off and all other units remain on. To traverse from level 3 to level 4, unit $U_2$ is turned back on and unit $U_3$ is turned off. By using this specific progression, the maximum number of units remain on and the total power consumption is maximized below a target. Also stepping between any two levels, a maximum of two units change state, thus reducing power surges on the line and noise in the control circuit.

To traverse from level 3 to level 4 is a non-binary coded decimal (BCD) progression (which would normally turn units $U_1$ and $U_2$ off). Although the BCD step may, in certain circumstances, provide optimum use of consumption, it does not maximize the number of units on. Optimization of power consumption alone is not true optimization in the real world when controlling energy demand. Generally, it is more desirable to have the maximum number of units on as, for example, the number of air conditioning units in a hotel, than to optimize power consumption below a target value. The count of FIG. 1 optimizes total power consumption with the maximum number of units on. The sequence continues by traversing the table of FIG. 1 wherein the off unit moves toward the last unit $U_n$ as illustrated at level n+1. To traverse from level n+1 to n+2 the unit $U_n$ stays off and unit $U_1$ is turned off. To traverse from n+2 to n+3, unit $U_1$ is turned back on and unit $U_2$ is turned off. This progression continues until the level 1 plus the sum of X as X goes from 1 to n wherein all the units are turned off, represented by all ones.

Although the optimization count or sequence will be described specifically for energy consumption control or management, the sequence can be used in any control system wherein a measurable quantity of a plurality of units is to be controlled relative to a target value. This may include feeder controls for a chemical process or any other system wherein it is desired to maximize the number of the units operating and to maximize the measurable quantity, be it their output or otherwise.

Figure 2:
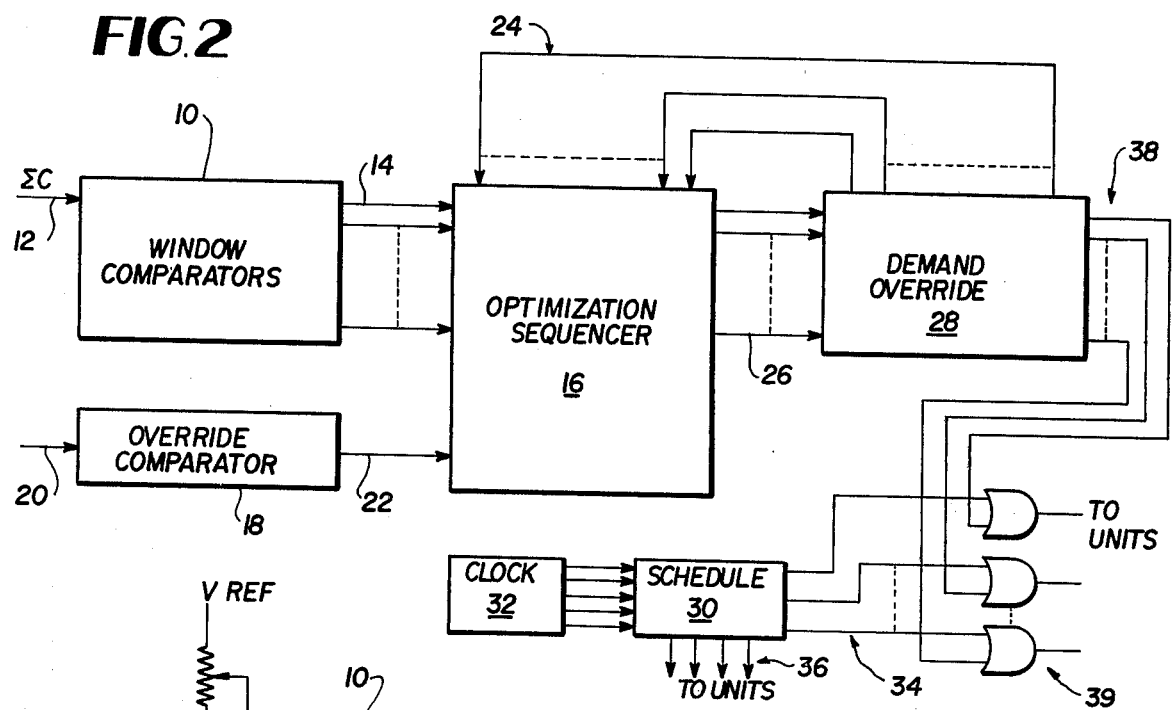
FIG. 2 is a block diagram schematic of a control system incorporating the theory of the present invention.

An energy monitoring and control system as illustrated in FIG. 2, includes window comparators 10 having an input 12 representing the total system consumption $\Sigma C$. The output of the plurality of window comparators at 14 are fed directly to the optimization sequencer 16. An override comparator 18 has an input 20 from a non-consumption variable—for example, temperature or humidity, etc.—and provides an output 22 to the optimization sequencer 16. As will be described in more detail later, the override comparator overrides the input from the window comparators and may enter the optimization sequence in a special status level or cause the optimization sequencer to step out of sequence based on the present status level or traverse a sequence defined by fewer units than n. The status of the demand controllable units are provided via lines 24 to the optimization sequencer 16. The output of the optimization sequencer along lines 26 are consumption requested status which are fed to a demand override circuit 28. The demand override 28 defines maximum and minimum off periods and minimum on periods and provides demand command status via lines 38 and feeds back the status over lines 24 to the optimization sequencer 16.

A real time 32 clock drives a time schedule circuit 30 which provides time command status to units which are both demand and time controllable via lines 34 and to time controllable units via lines 36. The demand command status on lines 38 are combined with the time command status on line 34 by a plurality of OR gates 39 to provide command status to units which are both demand and time controllable. The OR gates will shed or turn off a load if either or both the time or demand command status is shed. Although illustrated as OR logic gates, OR's 39 may be series switches or relays. Similarly, less than all of the demand controllable units may include an OR gate.

Adjustments for seasonal variations may be provided by schedule circuit 30 or the override comparator 18 and a special sequence in the optimization sequencer. The values of the window comparator could also be changed manually or automatically to adjust for seasonal variations.

Figure 3:
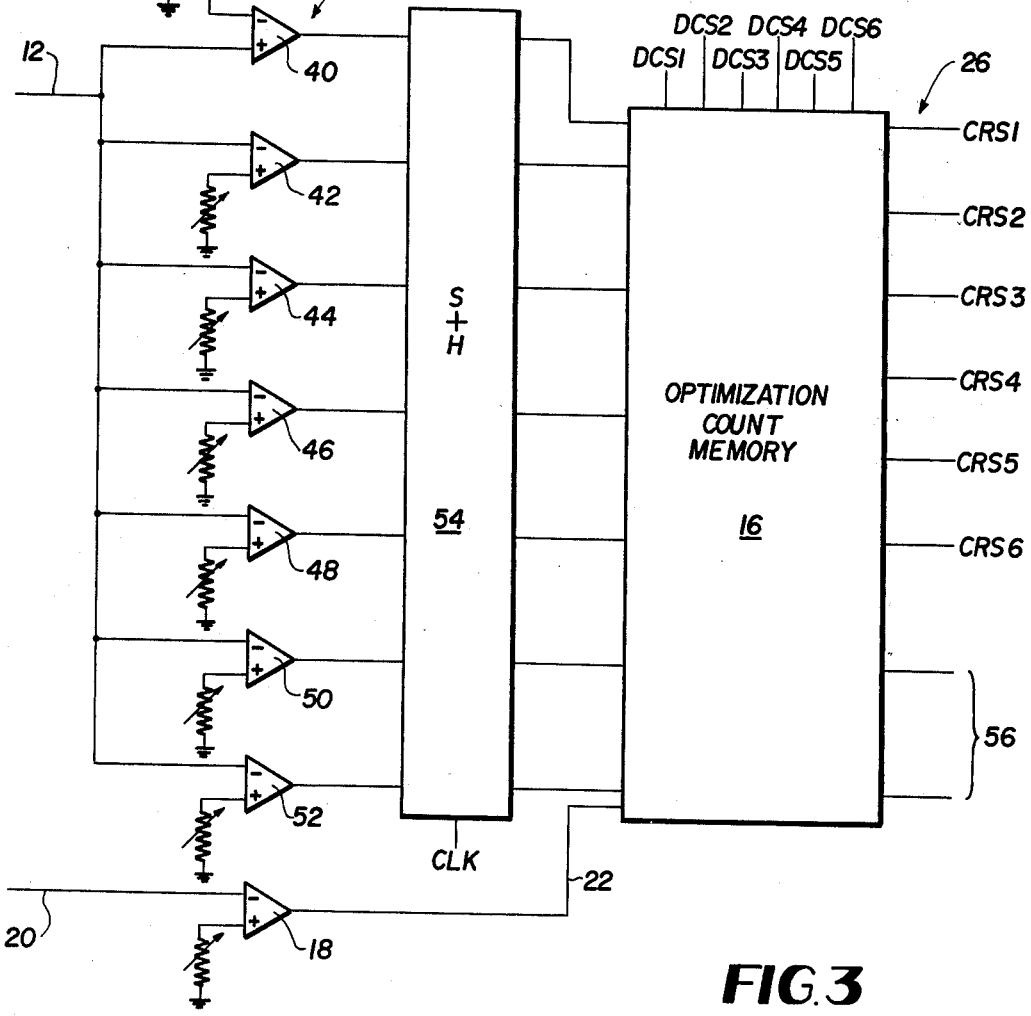
FIG. 3 is an embodiment of the consumption requested status portion of FIG. 2.

Details of the window comparator 10 and the optimization sequencer 16 are illustrated in FIG. 3. An analog signal representing the sum or total power consumption is provided on input 12 to a plurality of saturating differetial amplifiers 40, 42, 44, 46, 48, 50, and 52. Comparator 40 has a variable resistor on its negative input to provide the target value and receives the total consumption on its positive input. The remaining coparators have the total consumption on their negative input and have variable resistors on their positive inputs to set a value equal to the target value minus a differential between successive units. Thus comparator 40 forms the upper value of a plurality of six window comparators and the lower value is determined by comparators 42, 44, 46, 48, 50, and 52. The lower limit set by comparator 42 may be the target value T minus $U_1$ since the units $U_1$ through $U_6$ are in order of increasing power consumption where $U_1$ has the lowest consumption. Thus in order to take a step to turn $U_1$ on, the differential equivalent to the total value of the power consumption of $U_1$ must be available as information to the optimization sequencer 16.

The lower window value represented by comparator differential amplifier 44 could represent the power differential between units $U_1$ and $U_2$ relative to the target value T expressed as $T-(U_2-U_1)$. This would represent the power differential required to traverse the sequence illustrated in FIG. 7 from level 3 to 2, level 9 to 8, level 14 to 13, level 18 to 17, and level 21 to 20. In each of these level traversals or steps, unit $U_2$ is turned on and unit $U_1$ is turned off. Therefore, the differential between the two levels would represent the ability to make that transition. It should be noted that FIG. 7 represents the optimization count for the six units as illustrated for FIGS. 3-6, wherein FIG. 1 illustrated n units. Although six differential amplifiers are shown for the lower value of the window, one for each unit, if the differential between units $U_2$ and $U_3$ is equal to the differential between units $U_3$ and $U_4$, only a single differential amplifier need be used to represent that differential and provide those transitions.

The number of differential amplifiers 42 through 52 required depends upon the value of the differentials between the various steps. If the consumption differentials between the various units are identical and the consumption value of the lowest consumption unit is equal to this differential only a single lower value differential amplifier would be requied in combination with the upper value or target comparator 40. Similarly, if the differential between levels are equal but not equal to the consumption of the lowest unit, two lower value or window comparators would be required, one representing the consumption value of the target minus the consumption unit and the other representing the target minus the difference between units.

As illustrated in FIG. 3, saturating analog differential amplifiers are used as the window comparators. This is based on the total consumption being an analog signal detected and measured by a system of the type disclosed in Patent 3,862,430 and including transformers 13 through 18 and a three phase watt transducer 19. If the total consumption at input 12 is a digital signal obtained from other types of transducers, for example, a sum of pulses, the window comparators could be digital comparators. The essence of this portion of the system is that the comparators be window comparators to provide an indication whether the total consumption is above a target value or below the target minus differential consumption values.

The output of the plurality of the differential amplifiers or window detectors are provided through a sample and hold 54 to the optimization sequencer which is illustrated in FIG. 2 as optimization count memory 16 which may be a PROM. The input to the sample and hold provides an updated input to the optimization count memory as a function of the clock pulses CLK. The other address inputs to the optimization count memory are the demand command status via lines 24 and a signal from override comparator 18 via line 22. The command status and the information from the window comparators address the optimization count memory to provide outputs which correspond to consumption requested status equivalent to a single step up or down the optimization count or no step at all from the status as a function of the results of the window comparators. The input from the override comparator 18 (or a plurality of override comparators) could enter the optimization count at a unique level in violation of the demand command status address and traverse the count using the window comparator inputs or it could use the demand command status portion of the address and appear to traverse the optimization count out of sequence. The latter is accomplished by addressing a specific portion of the memory which has an optimization sequence of less than the six units of the present implementation. For example, if the humidity is high and units $U_4$ and $U_6$ and air conditioners, the override comparator could address a four unit count having units $U_1$, $U_2 U_3$, and $U_5$. This would make units $U_4$ and $U_6$ non-demand controllable.

To illustrate the optimization of the present count, the following examples are presented assuming no input from an override comparator.

If the sum of the total consumption is above the target value or outside the window on the high side, the optimization sequence will provide outputs on lines 26 representing a step or traversing the optimization count one step from the status level to reduce the total power consumption by adding and/or shedding loads. For example, if the demand status was eqialent to level 1 of FIG. 7 (all units on) and the total consumption exceeds the target value (comparator 40 being one), the optimization sequencer would take a single step to level 2 thereby turning off $U_1$. If this reduction in consumption is not sufficient, comparator 40 remains one, the new demand status is 000001, and another step will be taken to level 3 turning unit $U_1$ on and $U_2$ off. This is not specifically a shed command as in prior art systems but includes both a shed and restore command wherein the total consumption is reduced by the difference in the consumption of units $U_1$ and $U_2$. These two steps are illustrated in FIG. 8 as lines A and B. This will continue until the total consumption does not exceed the target value (comparator 40 being zero).

As illustrated in line C of FIG. 8 all of the comparators are zero indicating that the total comsumption is within the window defined by the comparators. Thus no step or change of status is required and the requested status is identical to the demand status. As shown at line C, level 14 of FIG. 7 is the requested status for a level 14 demand status.

Next, assume that the total consumption is reduced such that the total consumption is less than the target minus the consumption of unit $U_1$ as measured by comparator 42 but not less than the target minus the difference of consumption between unit $U_1$ and unit $U_2$ as measured by comparator 44. This is illustrated in line D of FIG. 8 wherein 42 is a one and 44 is a zero. If the demand status is that of level 14 of FIG. 7, no step is taken to increase total consumption since the consumption differential to take that step (i.e., 44 equals one) is not present. Thus the requested status is level 14 as illustrated in line D. If there is a further reduction of total consumption such that comparator 44 is a one, i.e., the total consumption is outside the low value of the window comparator defined by comparators 40 and 44, the optimization count memory will step from level 14 to level 13, turning unit $U_2$ on and unit $U_1$ off. This traversal is shown at line E of FIG. 8.

The present system allows the use of available consumption if the total consumption is outside or below the lower window value for the next step or level in the optimization count. Thus it prevents taking a step which would place the total consumption over the target which is the upper window value. Since most steps require turning a unit off while turning another unit on, the number of units on and the total consumption below a target are optimized.

The optimization count memory 16 may be a simple PROM which is driven directly by the sample and hold circuit 54. Additional outputs 56 may be used for control functions as required since only six consumption requested status outputs are used. Although the addressing of the count memory 16 is shown as including six status lines and seven window comparator lines, encoding of the demand status and the window comparator lines may be used to reduce memory storage requirements. Also, the optimization count can be expressed as a formula and implemented by a computer. The essence is that the optimization count of FIG. 1 is used with a window comparator and override comparator inputs and status inputs to provide an optimal control sequence.

The consumption requested status (CRS) of each unit is provided on the output of the optimization count memory 16 and may be used directly to control the units or, as in the present system, modified by maximum and minimum allowable off periods and a minimum allowable on period to provide more effective overall control. The demand override circuit 28, illustrated in FIG. 4 in detail, comprises a plurality of D-type flip-flops 58, 60, 62, 64, 66, and 68, having as their data input consumption requested status $CRS_1$, $CRS_2$, $CRS_3$, $CRS_4$, $CRS_5$, $CRS_6$, respectively. The Q outputs of the flip-flops are connected to the reset input of cycling devices illustrated as multivibrators 70, 72, 74, 76, 78, and 80, respectively, and the $\overline{Q}$ output of the flip-flops are connected through inverters 82, 84, 86, 88, 90, 92, respectively, to the trigger input of the respective multivibrators. The output of the multivibrators are demand command status signals $DCS_1$, $DCS_2$, $DCS_3$, $DCS_4$, $DCS_5$, $DCS_6$, respectively, which are returned via lines 24 as the status portion of the address to the optimization count memory 16. These outputs are also provided through buffer inverters 94, 96, 98, 100, 102, 104, respectively to control the units and, if desired, to a front panel having manual override and status indicators for each unit.

The purpose of the demand override circuit 28 is to prevent excessive cycling or turning loads on and off to define the maximum off time and minimum off and on time of any unit. Flip-flops 58 through 68 control the multivibrators 70 through 80 such that a consumption request signal to decrease or shed a unit will cause the multivibrators to define specific off/on command signals and periods therefore. The inverse of the clock signal $\overline{CLK}$ causes the D-type flip-flop to change state out of sequence with the clock pulses for sample and hold 54 of the window comparator that produces the consumption requested status. Thus, the CRS signals are updated just prior to the flip-flop transfer signal since the CRS updates on the rise and the flip-flop on the fall side of each clock pulse. The command requested status are clocked through the flip-flops to the multivibrators at a period defined by the clock interval. Since the Q output of the flip-flop is connected to the reset input of the multivibrator, the clock period defines the minimum off and on times for each unit.

Figure 4:
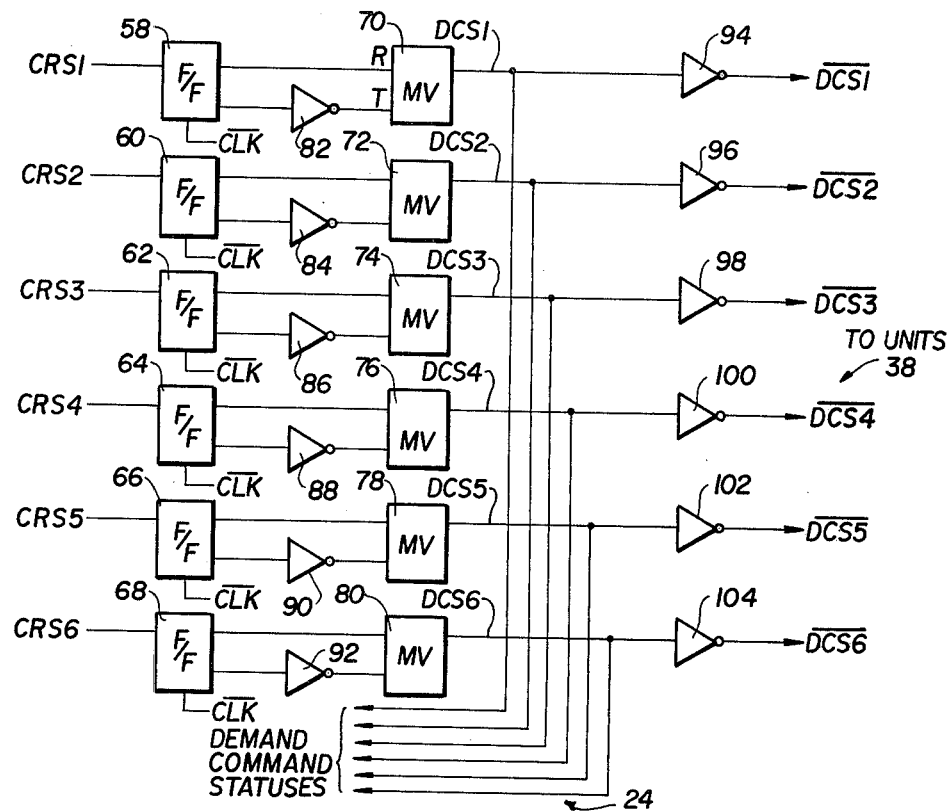
FIG. 4 is a schematic diagram of the demand override portion of FIG. 2.

Thus the circuitry of FIG. 4 describing the demand override circuit 28 causes a cycling of the command status to define minimum and maximum off periods and minimum on periods which are the period of the clock, the period of the multivibrator and the period of the clock, respectively. A decrease or shed command signal from the consumption requested status will reset the multivibrator to begin a decrease or shed demand command status. If the consumption requested status is changed in the next clock pulse, the multivibrator period is interrupted. Thus the minimum off period is the period of the clock pulse. If the consumption requested signal remains in the shed or reduced condition, the multivibrator will continue its period until it reaches the maximum off time wherein the multivibrator will change states and begin an on time period equal to the maximum off period. As long as the consumption requested status remains shed, the multivibrator will cycle with maximum off and minimum on times. These relationships are illustrated in FIG. 6 wherein the clock pulse is two minutes defining the minimum on and off time and the multivibrator cycle is six minutes on, six minutes off, defining a maximum off period of six minutes.

Figure 6:
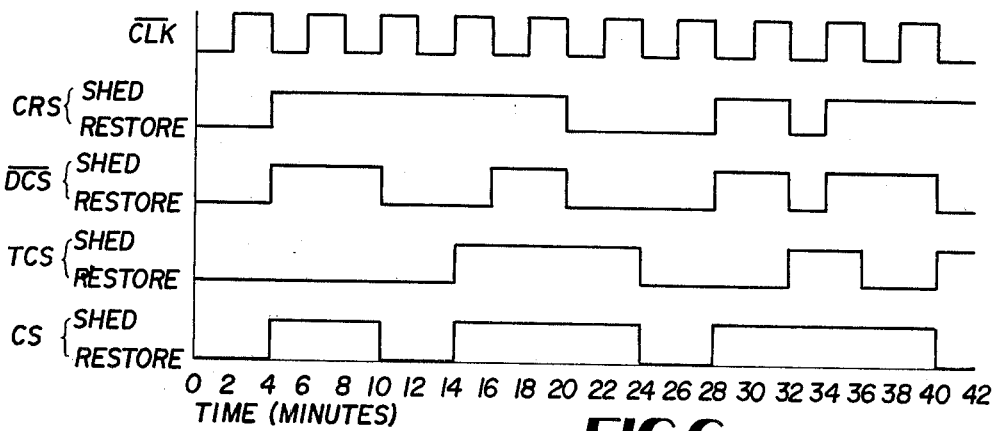
FIG. 6 is a time diagram illustrating the relationship of the demand command and the time command statuses for units which are both demand and time controllable.

Although FIG. 4 has one specific embodiment of a demand override circuit, other circuits may be provided which include digital counters as period clocks and other timing devices to perform the function illustrated in the wave forms of FIG. 6. Also, the cycling device need not have equal off and on periods.

Figure 5:
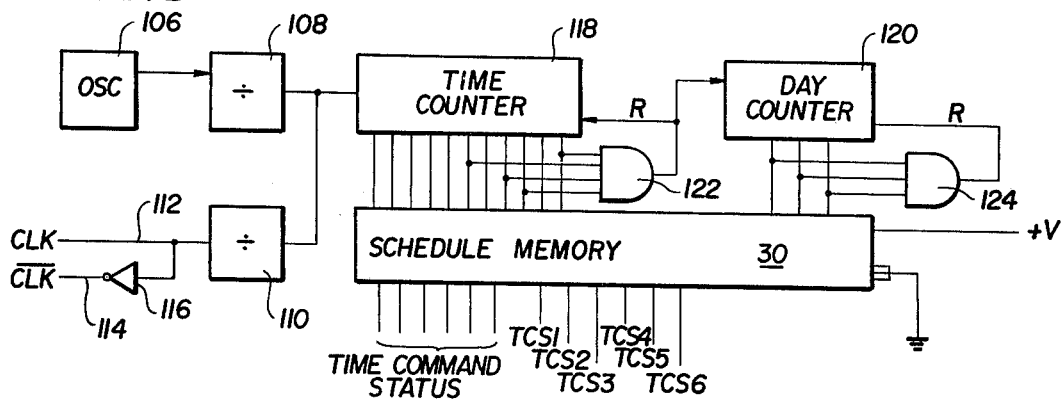
FIG. 5 is a block diagram schematic of the clock and scheduling portion of FIG. 2.

FIG. 5 illustrates the detail of the clock 32 and the schedule circuit 30. The clock 32 includes an oscillator 106 driving a divider 108. The output of divider 108, which represents one minutes intervals, is connected to divider 110 which provides a clock output CLK at 112 and the inverse of the clock output $\overline{CLK}$ at 114 through inverter 116. It should be noted that for the present embodiment, the divider 110 has a division factor of two to provide a clock period of two minutes. The output of divider 108 is also connected to a time counter 118 which acts as a real time clock to drive schedule memory 30. The output of the time counter 118 is used through AND gate 112 to reset itself and to drive the day counter 120 whose output through AND gate 124 resets itself and additional stages could be added to count weeks, months, or years. The scheduled memory may be a PROM directly addressed by both counters 118 and 120 to provide time command status. The time command status $TCS_{1\ through\ 6}$ may be used in combination with the demand command status $DCS_{1\ through\ 6}$ through OR gates to provide command status for units which are both demand and time controlled as a function of both demand and time scheduling. The relationship of the consumption requested status, demand command status, time command status, and the command status (as the output of the OR gates) is illustrated in FIG. 6. A shed command from DCS or TCS will provide a shed command CS.

The time command status from the schedule PROM 30 also control time controllable only units. A third type of unit, non-controllable, which may be provided in the present system are those units which are not controlled by the consumption control circuit nor the time control circuit, although the consumption of all three types of loads are used in the total consumption input 12 to the window comparators 10.

From the preceding description of the preferred embodiments, it is obvious that the objects of the invention are obtained and that an energy management system is provided which optimizes the number of units activated and the amount of consumption using the unique optimization count. Although the invention has been described and illustrated in detail, it is to be clearly understood that the same is by way of illustration and example only and is not to be taken by way of limitation. The optimization count may be used for sequentially controlling any units relative to a common measurable variable of the units. Although the circuitry has been described for IC implementation, it is obvious that the count and the window comparators may be performed in a computer implementation, the demand override circuit may be implemented using totally digital logic, and the time schedule implemented by rotary switches. The spirit and scope of the invention are being limited only by the terms of the appended claims.

What is claimed:

1. A system for controlling a plurality of variable rate consuming units comprising:
   means for determining the status of said units;
   first means for comparing the sum of the consumption of said units with a target;
   second means for comparing said sum and said target minus a differential for said units;
   means for establishing a sequence of increasing and decreasing total consumption of said units, each step of said sequence representing a condition of more than one unit;
   means for entering said sequence as a function of said status and traversing said sequence as a function of said comparisons.

2. The system according to claim 1 wherein said traversing means traverses said sequence from said status position decreasing total consumption when said sum exceeds said target and traverses said sequence increasing total consumption when said sum is less than the target minus the differential for the next step in the sequence from said status position.

3. The system according to claim 1 including a plurality of second comparison means one wherein the differential is the consumption of the lowest consuming unit and one additional for each different value of differential consumption of units in order of increasing consumption.

4. The system according to claim 3 wherein said traversing means traverses said sequence increasing total consumption when said sum is less than said target minus said differential for the next step in the sequence from said status position.

5. The system according to claim 1 wherein additional units are provided in the sum of consumption but are not included in the status nor are they controlled by the system.

6. The system according to claim 1 wherein said sequence optimizes the number of units on and total consumption relative to said target.

7. In a system for controlling a plurality of individually controllable units by increasing or decreasing total units capacity to achieve a target value of the sum of a common measurable variable of said units, the improvement comprising means for increasing and decreasing said units capacity by traversing the following sequence from a sensed state:

| | $U_n$ | $U_{(n-1)}$ | .... | $U_3$ | $U_2$ | $U_1$ |
|---|---|---|---|---|---|---|
| 1 | 0 | 0 | | 0 | 0 | 0 |
| 2 | 0 | 0 | | 0 | 0 | 1 |
| 3 | 0 | 0 | | 0 | 1 | 0 |
| 4 | 0 | 0 | | 1 | 0 | 0 |
| : | : | : | | : | : | : |
| n | 0 | 1 | | 0 | 0 | 0 |
| n+1 | 1 | 0 | | 0 | 0 | 0 |
| n+2 | 1 | 0 | | 0 | 0 | 1 |
| n+3 | 1 | 0 | | 0 | 1 | 0 |
| n+4 | 1 | 0 | | 1 | 0 | 0 |
| : | : | : | | : | : | : |
| 2n | 1 | 1 | | 0 | 0 | 0 |
| 2n+1 | 1 | 1 | | 0 | 0 | 1 |
| : | : | : | | : | : | : |
| $1 + \sum_{x=1}^{n} x$ | 1 | 1 | | 1 | 1 | 1 | where n is the number of controllable units and the units are in increasing order of capacity where $U_1$ has the smallest consumption, addressable storage means for storing said sequence, means for sensing capacity state of said units and means for addressing said storage means with said sensed state.

8. The system according to claim 7 including means for comparing said sum of a common measurable variable with said target to provide a comparison signal, and wherein said addressing means address said storage means with said sensed state and comparison signal to select an appropriate level in said sequence.

9. The system according to claim 8 wherein said comparing means includes first means for comparing said sum to said target to provide a first comparison signal and second means for comparing said sum to a window value less than said target to provide second comparison signals wherein said comparison signal includes said first and second comparison signals.

10. The system according to claim 9 wherein said addressing means traverses said sequence to decrease total units capacity when said sum exceeds said target and traverses said sequence to increase total units capacity when said sum is less than window value for the next step in said sequence.

11. The system according to claim 7 including means for traversing said sequence out of sequence in response to a variable other than said common measurable variable.

12. The system according to claim 11 wherein said out of sequence means traverses said sequence for an n less than the n defined without said other variable.

13. In a system for controlling a plurality of individually controllable units by increasing or decreasing total units capacity to achieve a target value of the sum of a common measurable variable of said units, the improvement comprising means for increasing and decreasing said units capacity by traversing the following sequence from a sensed state:

| | $U_n$ | $U_{(n-1)}$ | .... | $U_3$ | $U_2$ | $U_1$ |
|---|---|---|---|---|---|---|
| 1 | 0 | 0 | | 0 | 0 | 0 |
| 2 | 0 | 0 | | 0 | 0 | 1 |
| 3 | 0 | 0 | | 0 | 1 | 0 |
| 4 | 0 | 0 | | 1 | 0 | 0 |
| : | : | : | | : | : | : |
| n | 0 | 1 | | 0 | 0 | 0 |
| n+1 | 1 | 0 | | 0 | 0 | 0 |
| n+2 | 1 | 0 | | 0 | 0 | 1 |
| n+3 | 1 | 0 | | 0 | 1 | 0 |
| n+4 | 1 | 0 | | 1 | 0 | 0 |
| : | : | : | | : | : | : |
| 2n | 1 | 1 | | 0 | 0 | 0 |
| 2n+1 | 1 | 1 | | 0 | 0 | 1 |
| : | : | : | | : | : | : |
| $1 + \sum_{x=1}^{n} x$ | 1 | 1 | | 1 | 1 | 1 | where n is the number of controllable units and the units are in increasing order of capacity where $U_1$ has the smallest consumption, and said means includes means for decreasing total units capacity in said sequence when said sum exceeds said target and increasing total units capacity when said sum is less than said target minus the capacity differential for the next step in said sequence.

14. The system according to claim 13 including means for entering said sequence at other than the sensed state in response to a variable other than said common measurable variable.

15. In a system for controlling a plurality of individually controllable units by increasing or decreasing total units capacity to achieve a target value of the sum of a common measurable variable of said units, the improvement comprising means for increasing and decreasing said units capacity by traversing the following sequence from a sensed state:

| | $U_n$ | $U_{(n-1)}$ | .... | $U_3$ | $U_2$ | $U_1$ |
|---|---|---|---|---|---|---|
| 1 | 0 | 0 | | 0 | 0 | 0 |
| 2 | 0 | 0 | | 0 | 0 | 1 |
| 3 | 0 | 0 | | 0 | 1 | 0 |
| 4 | 0 | 0 | | 1 | 0 | 0 |
| : | : | : | | : | : | : |
| n | 0 | 1 | | 0 | 0 | 0 |
| n+1 | 1 | 0 | | 0 | 0 | 0 |
| n+2 | 1 | 0 | | 0 | 0 | 1 |
| n+3 | 1 | 0 | | 0 | 1 | 0 |
| n+4 | 1 | 0 | | 1 | 0 | 0 |
| : | : | : | | : | : | : |
| 2n | 1 | 1 | | 0 | 0 | 0 |
| 2n+1 | 1 | 1 | | 0 | 0 | 1 |
| : | : | : | | : | : | : |
| $1 + \sum_{x=1}^{n} x$ | 1 | 1 | | 1 | 1 | 1 | where n is the number of controllable units and the units are in increasing order of capacity where $U_1$ has the smallest consumption, and said means includes means for not changing total units capacity when said sum exceeds said target minus the capacity differential for the next step in the sequence but is less than said target.

16. The system according to claim 15 wherein said sum includes values of units not controlled by said system.

17. A system for controlling a plurality of variable rate consuming units comprising:
means for determining the status of said units;
first means for comparing the sum of the consumption of said units with a target;
means for establishing a sequence of increasing and decreasing total consumption of said units, each step of said sequence representing a condition of more than one unit; and
means for entering said sequence as a function of said status and traversing said sequence as a function of said comparison;
second means for comparing a variable other than consumption to a predetermined value and overriding said status whereby said traversing means traverses said sequence as a function of both comparison means and not said status.

18. A system for controlling a plurality of variable rate consuming units comprising:
means for determining the status of said units;
first means for comparing the sum of the consumption of said units with a target;
second means for comparing a variable other than consumption to a predetermined value;
means for establishing a sequence of increasing and decreasing total consumption of said units, each step of said sequence representing a condition of more than one unit; and
means for entering said sequence as a function of said status and traversing said sequence in sequence as a function of said first comparison means and out of sequence as a function of both comparison means.

19. A system for controlling a plurality of variable rate consuming units comprising:
means for determining the status of said units;
means for comparing the sum of the consumption of said units with a target;
means for establishing the following sequence of increasing and decreasing total consumption of said units;

| | $U_n$ | $U_{(n-1)}$ | .... | $U_3$ | $U_2$ | $U_1$ |
|---|---|---|---|---|---|---|
| 1 | 0 | 0 | | 0 | 0 | 0 |
| 2 | 0 | 0 | | 0 | 0 | 1 |
| 3 | 0 | 0 | | 0 | 1 | 0 |
| 4 | 0 | 0 | | 1 | 0 | 0 |
| : | : | : | | : | : | : |
| n | 0 | 1 | | 0 | 0 | 0 |
| n+1 | 1 | 0 | | 0 | 0 | 0 |
| n+2 | 1 | 0 | | 0 | 0 | 1 |
| n+3 | 1 | 0 | | 0 | 1 | 0 |
| n+4 | 1 | 0 | | 1 | 0 | 0 |
| : | : | : | | : | : | : |
| 2n | 1 | 1 | | 0 | 0 | 0 |
| 2n+1 | 1 | 1 | | 0 | 0 | 1 |
| : | : | : | | : | : | : |
| $1 + \sum_{x=1}^{n} x$ | 1 | 1 | | 1 | 1 | 1 | where n is the number of controllable units and the units are in increasing order of capacity where $U_1$ has the smallest consumption; and
means for traversing said sequence as a function of said status and comparison.

20. A system for controlling a plurality of variable rate consuming units comprising:
   first means for requesting increased or decreased unit consumption in a given sequence as a function of units status and the sum of consumption relative to a target, each step of said sequence representing a condition of more than one unit and traversing said sequence between steps can involve requesting simultaneously increased unit consumption and decreased unit consumption; and
   means for determining the minimum on and off periods and the maximum off period of each unit in response to said request of said first means to provide a demand command status.

21. The system according to claim 20 wherein said sequence optimizes the number of units on and total consumption relative to said target.

22. The system according to claim 20 wherein said period means includes means for determining said maximum off period by cycling the decrease unit consumption requested for an off and on period in response to a decrease unit consumption request from said first means.

23. The system according to claim 22 wherein said period means includes means for determining said minimum on and off periods by initiating and interrupting an off period of said cycling means in response to an unit consumption request from said first means.

24. The system according to claim 23 wherein said cycling means is a multivibrator whose period defines said maximum off period and said initiating-interrupting means is a clock whose period defines said minimum on and off periods.

25. The system according to claim 23 including a plurality of initiating-interrupting means and cycling means, one for each unit.

26. A system for controlling a plurality of variable rate consuming units comprising:
   first means for requesting increased or decreased unit consumption in a given sequence as a function of units status and the sum of consumption relative to a target, each step in said sequence representing a condition of more than one unit;
   second means for determining the period of on and off times of said units in response to said request of said first means to provide a demand command status;
   third means for requesting an increased or decreased unit consumption as a function of time to provide a time command status; and
   fourth means for ORing the demand and time command decrease status and commanding decreased unit consumption.

27. The system according to claim 26 wherein said status for said first means is derived from the demand command status of said second means.

28. The system according to claim 26 including a second plurality of units included in the sum of consumption, said first means not providing requests for said second plurality of units and said third means providing commands for any or all of said second plurality of units.

29. The system according to claim 26 wherein said third means includes means for providing real time and addressable means for storing commands as a function of time, said time means addressing said addressable means to provide said time command status as a function of real time.

30. A control system for controlling a plurality of variable rate consuming units comprising:
   first means for comparing the sum of consumption of all of said units with a target;
   second means for comparing said sum with said target minus a differential of consumption of demand controllable loads;
   means for establishing a sequence of adding and shedding demand controllable units;
   means for determining the status of said demand controllable units; and
   means for traversing said sequence from said determined status position as a function of said first and second comparisons to produce consumption requested status.

31. The control system according to claim 30 wherein said sequence means includes a storage means storing said sequence and said traversing means addresses said storage means using said detected status and said first and second comparisons.

32. The control system according to claim 30 wherein said traversing means decreases total consumption in said sequence when said sum exceeds said target.

33. The control system according to claim 30 wherein said traversing means increases total consumption in said sequence when said sum is less than said target minus the differential for the next step in the sequence.

34. The control system according to claim 30 including means for providing time, means responsive to said time to provide time command status, and means responsive to said consumption requested and time command status to provide command status for said units which are both demand and time controllable units.

35. The control system according to claim 34 wherein said status determining means monitors said consumption requested status.

36. The control system according to claim 34 including means responsive to said time to provide time command status for time controllable units.

37. The control system according to claim 34 wherein said command means provides a shed command status if either consumption requested or time command status is shed.

38. The control system according to claim 30 including means for cycling shed consumption requested status as a shed and add demand command status to define a maximum off period of a unit.

39. The control system according to claim 30 wherein said sequence is

|  | $U_n$ | $U_{(n-1)}$ | .... | $U_3$ | $U_2$ | $U_1$ |
|---|---|---|---|---|---|---|
| 1 | 0 | 0 |  | 0 | 0 | 0 |
| 2 | 0 | 0 |  | 0 | 0 | 1 |
| 3 | 0 | 0 |  | 0 | 1 | 0 |
| 4 | 0 | 0 |  | 1 | 0 | 0 |
| : | : | : |  | : | : | : |
| n | 0 | 1 |  | 0 | 0 | 0 |
| n+1 | 1 | 0 |  | 0 | 0 | 0 |
| n+2 | 1 | 0 |  | 0 | 0 | 1 |
| n+3 | 1 | 0 |  | 0 | 1 | 0 |
| n+4 | 1 | 0 |  | 1 | 0 | 0 |
| : | : | : |  | : | : | : |
| 2n | 1 | 1 |  | 0 | 0 | 0 |
| 2n+1 | 1 | 1 |  | 0 | 0 | 1 |
| : | : | : |  | : | : | : |
| $1 + \sum_{x=1}^{n} x$ | 1 | 1 |  | 1 | 1 | 1 | where n is the number of controllable units and the units are in increasing order of capacity where $U_1$ has the smallest consumption.

40. The control system according to claim 39 including means for measuring a non-consumption variable and wherein said traversing means traverses said sequence in response to said measuring means.

41. The control system according to claim 40 wherein said traversing means traverses said sequence from the status position non-sequentially in response to said measuring means.

42. The control system according to claim 40 wherein said traversing means traverses said sequence in sequence from a status selected in response to said measuring means.

43. The control system according to claim 39 wherein said sequence optimizes the number of units on and total consumption relative to said target.

44. A control system for a plurality of consuming units comprising
   means for comparing the sum of consumption of all of said units with a window having an upper and a lower value;
   means for establishing a sequence of adding and shedding demand controllable units to increase or decrease said sum;
   means for determining the status of said demand controllable units; and
   means for traversing said sequence from said determined status position when said sum is outside said window.

45. The control system according to claim 44 wherein said comparing means includes a plurality of windows each having the same upper value and different lower value.

46. The control system according to claim 45 wherein said traversing means traverses said sequence from said determined status when said sum is outside the window defining the consumption differential for the next step in the sequence.

47. The control system according to claim 46 wherein said sequence is:

|  | $U_n$ | $U_{(n-1)}$ | .... | $U_3$ | $U_2$ | $U_1$ |
|---|---|---|---|---|---|---|
| 1 | 0 | 0 |  | 0 | 0 | 0 |
| 2 | 0 | 0 |  | 0 | 0 | 1 |
| 3 | 0 | 0 |  | 0 | 1 | 0 |
| 4 | 0 | 0 |  | 1 | 0 | 0 |
| : | : | : |  | : | : | : |
| n | 0 | 1 |  | 0 | 0 | 0 |
| n+1 | 1 | 0 |  | 0 | 0 | 0 |
| n+2 | 1 | 0 |  | 0 | 0 | 1 |
| n+3 | 1 | 0 |  | 0 | 1 | 0 |
| n+4 | 1 | 0 |  | 1 | 0 | 0 |
| : | : | : |  | : | : | : |
| 2n | 1 | 1 |  | 0 | 0 | 0 |
| 2n+1 | 1 | 1 |  | 0 | 0 | 1 |
| : | : | : |  | : | : | : |
| $1 + \sum_{x=1}^{n} x$ | 1 | 1 |  | 1 | 1 | 1 | where n is the number of controllable units and the units are in increasing order of capacity where $U_1$ has the smallest capacity.

48. The control system according to claim 44 wherein said sequence optimizes the number of units on and total consumption relative to said target.

49. A system for controlling a plurality of variable rate consuming units comprising:
   first means for commanding increased or decreased total units consumption in a given sequence as a function of units status and the sum of consumption relative to a target;
   second means for commanding decreased unit consumption as a function of time; and
   third means for commanding decreased unit consumption in response to a decrease command from said first or second means and for commanding increased consumption for lack of decrease command from both said first and second means.

50. The system according to claim 49 wherein said second means includes means for providing real time in a binary format and addressable means for storing shed and restore commands as a function of time, said time means directly addressing said addressable means to provide said commands as a function of time.

51. The system according to claim 50 including a second plurality of units, said addressable means include shed and restore commands for said second plurality of units as a function of time, said second plurality of units are independent of said first means and said sum includes said second plurality of units.

* * * * *